United States Patent
Knapp

(10) Patent No.: US 7,000,280 B1
(45) Date of Patent: Feb. 21, 2006

(54) AGGRESSIVE PIPELINE PIG

(76) Inventor: Kenneth M. Knapp, 4018 W. Main St., Houston, TX (US) 77020

( * ) Notice: Subject to any disclaimer, the term of this patent is extended or adjusted under 35 U.S.C. 154(b) by 387 days.

(21) Appl. No.: 10/452,630

(22) Filed: Jun. 2, 2003

(51) Int. Cl.
  *B08B 9/04* (2006.01)
(52) U.S. Cl. .............................. 15/104.061
(58) Field of Classification Search ......... 15/104.061, 15/3.5, 3.51
  See application file for complete search history.

(56) References Cited

U.S. PATENT DOCUMENTS

| | | | | |
|---|---|---|---|---|
| 2,399,544 A | * | 4/1946 | Danner | 138/93 |
| 2,445,645 A | * | 7/1948 | Stephens | 118/408 |
| 3,025,118 A | * | 3/1962 | Ver Nooy | 137/561 R |
| 3,643,280 A | * | 2/1972 | Powers | 15/104.061 |
| 3,857,132 A | * | 12/1974 | Knapp et al. | 15/104.061 |
| 4,242,771 A | | 1/1981 | Knapp | |
| 4,275,475 A | * | 6/1981 | Schwartz et al. | 15/104.061 |
| 4,506,401 A | * | 3/1985 | Knapp | 15/104.061 |
| 4,726,089 A | * | 2/1988 | Knapp | 15/104.061 |
| 5,265,302 A | * | 11/1993 | Sivacoe | 15/104.061 |
| 5,384,929 A | | 1/1995 | Smith | |
| 5,903,946 A | * | 5/1999 | Collins et al. | 15/104.061 |
| 5,924,158 A | | 7/1999 | Watts | |
| 6,067,682 A | * | 5/2000 | Rankin | 15/104.061 |

FOREIGN PATENT DOCUMENTS

GB  2 038 987  * 7/1980

* cited by examiner

*Primary Examiner*—Randall Chin
(74) *Attorney, Agent, or Firm*—Law Office of Tim Cook, P.C.

(57) ABSTRACT

A modular pipeline pig provides scraping cup having holes therethrough, adapted to retain a plurality of scraper studs. Positioned a well-defined distance behind the scraping cup is a driving cup defined by a slightly larger diameter than the scraping cup. The studs in the scraping cup may be of any appropriate shape or material, depending in the particular job. The driving cup is preferably mounted on the forward end of a mandrel, and another driving cup mounted to the back end of the mandrel. The pig is modular, so that other scrapers and or cups may be mounted to suit the needs of a particular job.

10 Claims, 3 Drawing Sheets

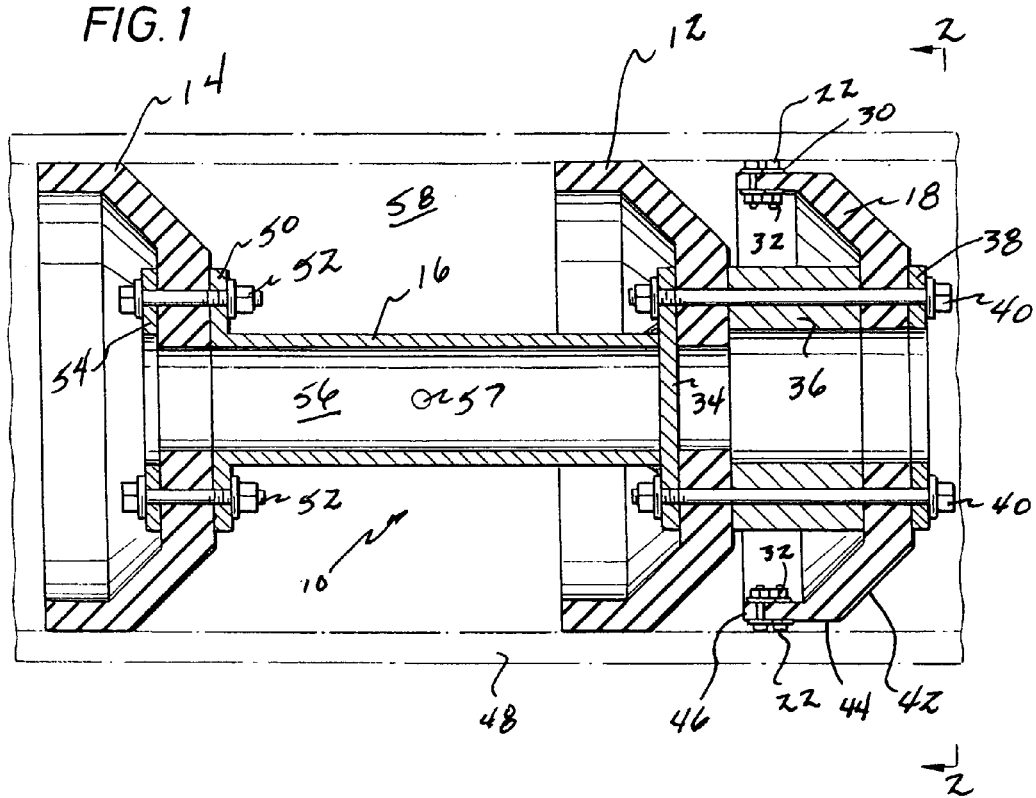

AGGRESSIVE PIPELINE PIG

FIELD OF THE INVENTION

The present invention relates generally to the field of pipeline pigs, and, more particularly, to pipeline pig for the removal of hard, tenacious deposits on the inside surface of a pipeline.

BACKGROUND OF THE INVENTION

Materials in crude oil, particularly paraffin, tend to build up in pipelines carrying such crude oil. Some of the materials originate in water used in secondary recovery efforts, but materials other than crude oil and gas exist in the crude in its natural state, and over time, the build up of precipitants on the interior surfaces of pipes degrades performance of the flow of fluids through the pipeline.

When crude oil is pumped from the ground and transported through pipelines, a large heavy material separates and comes out of solution. The main component of this residue is high molecular weight paraffin waxes. In some cases the wax represents as much as 90 percent of the deposited residues, and varies according to the origin of the crude oil.

Over the years, pipeline pigs have evolved to remove paraffin and other materials obstructing pipelines, and each step in the evolution of pigs has typically addressed a specifically identified need in the art. One need recognized in the art involves the removal of hard, solid, crystalline deposits within the pipe. In pipelines carrying crude oil, the deposits may originate from components in the crude, or elsewhere. In natural gas lines, the deposits commonly form at junctions of pipelines where dry and wet gas mix together. Typically, these deposits vary substantially in thickness throughout the pipe, so that a pig that can fit through the smallest diameter of the deposits is not particularly effective in removing the deposits, and larger pigs that effectively attack the deposits are likely to become plugged in the pipe.

To attack these hard, tenacious deposits, a known pipeline pig was developed which comprises a drive cup, a flexible coupling trailing behind the drive cup, and a set of one or more disks in which adjustable studs are molded into the disks. During a first pass of the pig through the pipe, a relatively small size disk is used, and the studs are adjusted to a relatively small diameter to run through the pipe, with relatively few studs installed on the disk(s). With subsequent runs of the pig through the pipe, more studs are added, and the studs are gradually adjusted to larger and larger diameters. Then, a larger size disk is installed on the trailing mount, and the process is repeated, adjusting the outside diameter of the studs and installing larger and larger disks, until the pipe is opened to an extent close to the inside diameter of the pipe. Often, this process may take up to one hundred runs of the pig through the pipe. It will be appreciated that the process is slow and labor intensive.

Thus, there remains a need for a pipeline pig that can aggressively attack such deposits. The present invention addresses this need in the art.

SUMMARY OF THE INVENTION

The present invention provides a modular pipeline pig defined by scraping cup having holes therethrough, adapted to retain a plurality of scraper studs. Positioned a well-defined distance behind the scraping cup is a driving cup defined by a slightly larger diameter than the scraping cup. The studs in the scraping cup may be of any appropriate shape or material, depending in the particular job. The driving cup is preferably mounted on the forward end of a mandrel, and another driving cup mounted to the back end of the mandrel. The pig is modular, so that other scrapers and or cups may be mounted to suit the needs of a particular job.

One distinct advantage in mounted the scraping studs to the cup is that, under pressure, the cup tends to balloon or vector outward, bringing the scraping studs into abrading contact with the target deposit layer. When smaller diameter deposit regions are reached, the polymeric material of the cup onto which the studs are mounted flexes inward to accommodate the reduced diameter region.

In another preferred embodiment of the invention, a plane, un-studded driving cup is mounted on the front end of the pig, and a studded cup is mounted on the back end. In this way, deposit material is scraped from the wall of the pipe at the tail end of the pig, and left behind in the pipe for a subsequent sweeping or flushing operation.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

FIG. 1 is a side section view of a presently preferred embodiment of the pig of this invention.

FIG. 2 is an end view of the pig of FIG. 1.

DETAILED DESCRIPTION OF PREFERRED EMBODIMENTS

Figure 3A:
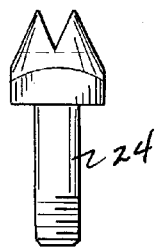
FIGS. 3a, 3b, and 3c depict the variety of shapes of a set of studs which may find application in this invention.

FIG. 1 depicts a side section view of a pig 10 comprising primarily a front driving cup 12, a back driving cup 14, and an axially oriented mandrel 16 between them. FIG. 2 illustrates the pig 10 as viewed along view lines 2—2. The front and back driving cups 12 and 14 are preferably formed of a flexible, polymeric material, such as for example polyurethane.

Figure 3B:
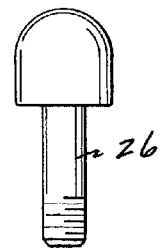
Figure 3C:
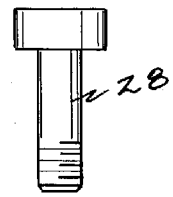

Positioned forward of the front driving cup 12 is a scraper cup 18. Holes 20 (see FIG. 4) are drilled into the scraper cup 18 to receive a set of studs 22. The outer profile of the studs may take a variety of shapes, as shown in FIGS. 3a, 3b, and 3c. FIG. 3a shows toothed stud 24, FIG. 3b shows a domed button stud 26, and FIG. 3c shows a square-shaped stud 28. One such stud 24, 26, 28 may be appropriate for a particular stage of performing pigging of a particular pipe, while any or all of them may be used at some point in the pigging evolution.

Returning to FIG. 1, the stud 22 is mounted from the outside of the cup 18 onto a washer 30. An important feature of the invention provides that the stud 22 is accessible from the underside of the cup 18, because the stud is mounted with a nut 32 to adjust the height of the stud extending above the cup. Also, and more importantly, the studs can be removed by removing the nut and the stud replaced with new, unworn studs. Thus, the pig can be quickly, easily, and inexpensively put back into the pipe for a pigging operation.

The driving cup 12 is placed onto a forward flange 34, integrally formed as a part of the mandrel 16. A cylindrical spacer 36 is then placed onto the top surface of the driving cup 12 to properly space the scraper cup 18 a distance in front of the driving cup so that the scraper cup does not collapse back on the driver cup. The scraper cup 18 is then placed on the spacer 36, and finally a mounting plate 38 is place on the forward surface of the scraper cup. A set of bolts and washers 40 then mount the entire assembly to the mandrel 16.

As shown in FIG. 1, the scraper cup 18 preferably defines a first angled or conical face 42 and a second angled or conical face 44 extending from the first angled face to a trailing edge 46. The holes 20 are drilled or otherwise formed through the cup along the second angled face 44. In FIG. 1, the second angled face 44 appears to be parallel to the interior surface of a tubular 48, such as an oil and gas pipe, because the face 44 has been forced back through force of the contact of the studs with the interior surface of the tubular. The angle of the face 44 in its quiescent state is more clearly shown in FIG. 5, which shows the pig before entry into the tubular.

The back driving cup 14 is attached to the mandrel 16 at an after flange 50 by a plurality of bolts and nuts 52. The cup 14 is further supported on the side opposite the flange by a support ring 54. The back driving cup 14, like the front driving cup 12, is an incrementally larger size than the scraper cup 18 to provide motive force for the pig 10 through a pipeline.

As shown in FIG. 1, the mandrel 16 is hollow, thereby defining a through-channel 56. The mandrel is preferably made of steel, and is substantially inflexible. A radially disposed hole 57 is formed in the mandrel so that fluid from behind the back driving cup 14 flows up through the channel 56, out the hole, and into an annulus 58 between the mandrel and the tubular 48. In this way, driving force is exerted behind both the front and back driving cups for axial force on the pig. This feature of the invention helps to keep the pig from getting cocked in the pipeline during use.

Figure 4:
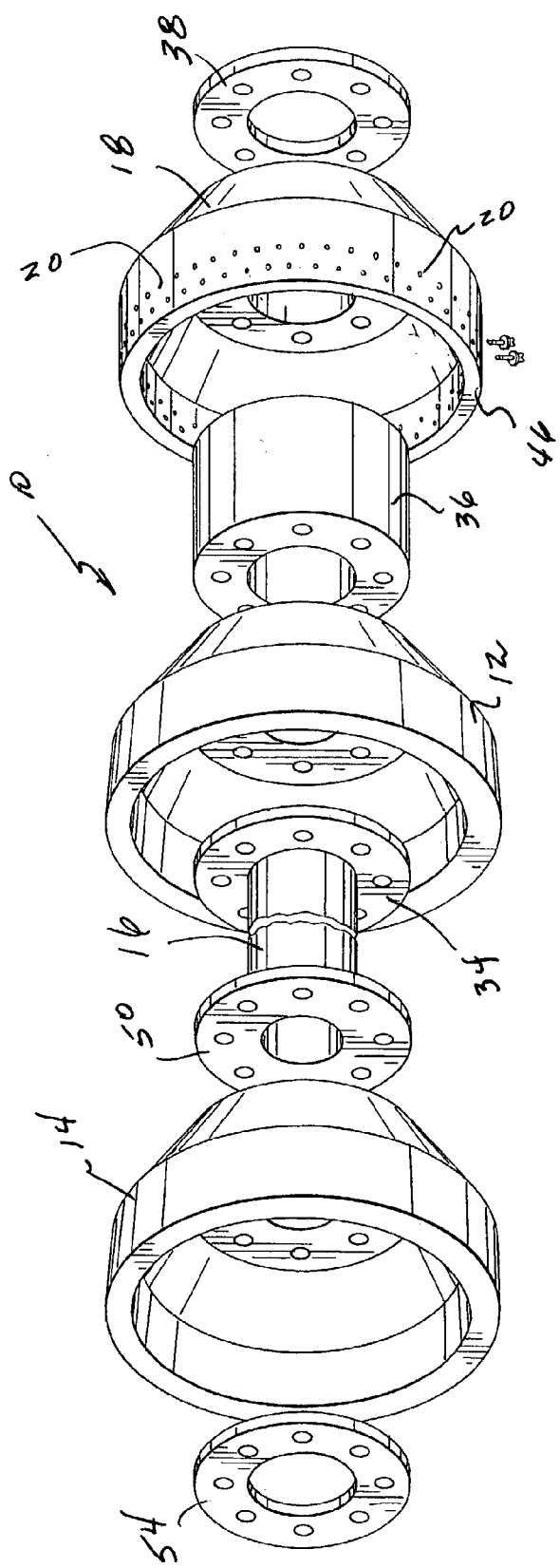
FIG. 4 is an exploded view of the pig of FIG. 1.

FIG. 4 illustrates the pig 10 in an exploded view to show the assembly of the pig and its various major components. Beginning with the forward end of the pig, the mounting plate 38 sits on the forward end of the scraper cup 18 which is separated from the front drive cup 12 by a spacer 36. The length of the spacer 36 is determined by the diameter of the scraper cup 18, in that the scraper cup and the drive cup 12 must be spaced apart such that when the pig moves through the narrowest portion of the pipeline, and the scraper cup is forced back toward the rear of the pig, the trailing edge 46 does not contact the front driver cup 12. The front driver cup 12 mounts to the flange 34 of the mandrel 16 and the back driver cup 14 mounts to the flange 50. The back driver cup 14 is secured to the flange 50 by the support ring 54. Note also that the holes 20 penetrate all the way through the scraper cup, so that the mounting hardware for the studs is accessible from the back of the scraper cup. In this way, worn studs may be replaced or adjusted in the field to save time in operation of the pig.

Figure 5:
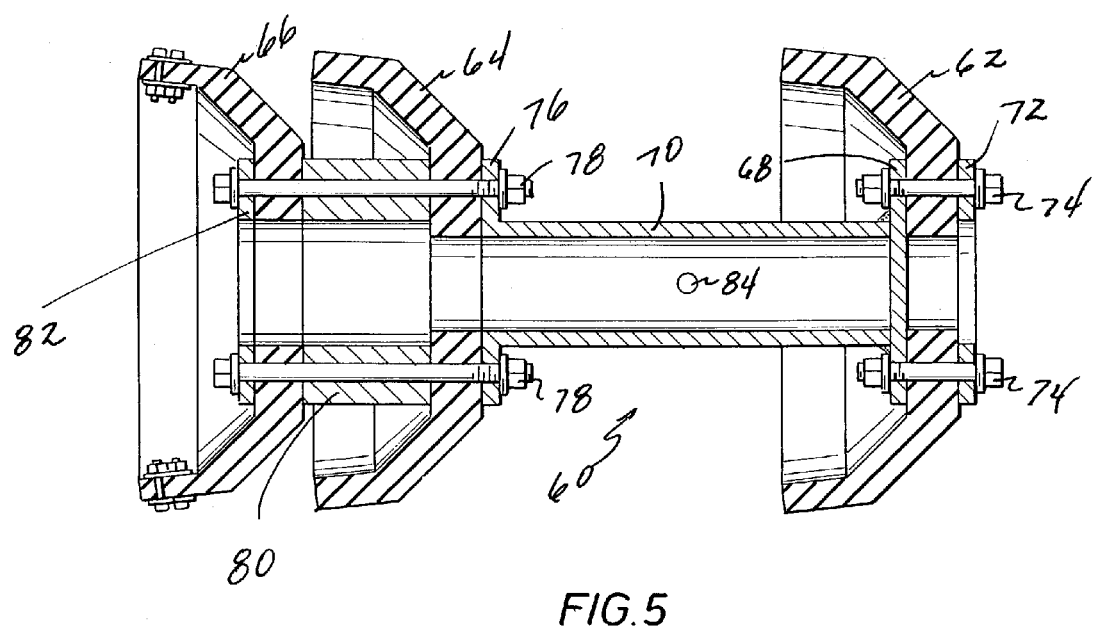
FIG. 5 is a side section view of another presently preferred embodiment, wherein the scraper element is mounted on the back end of the pig.

FIG. 5 depicts another preferred embodiment of the invention. A pig 60 comprises a front drive cup 62, a back drive cup 64, and a scraper cup 66 behind the back drive cup 64. In applications where the cuttings removed by a scraper cup at the forward end of the pig may present problems for the proper operation of the pig, it is desirable to leave the cuttings behind the pig. This feature of provided by the pig 60 by placing the scraping cup at the trailing end of the pig.

The front drive cup 62 is mounted to a flange 68 of a mandrel 70 and supported by a support ring 72. The support ring 72 mounts the front drive cup 62 to the flange 68 with a set of bolts and nuts 74. Similarly, the back drive cup 64 mounts to a flange 76 with a set of bolts and nuts 78. The back drive cup 64 is separated from the scraper cup 66 with a spacer 80 so that the back drive cup does not come into contact with the scraper cup during travel through the narrowest region of the pipeline. The scraper cup 66 is mounted in abutting contact with the spacer by a support ring 82. As before in respect of the pig 10, a hole 84 through the hollow mandrel provides fluid between the front and back drive cups to balance the movement of the pig and to prevent the pig from getting cocked in the pipeline.

It should now be clear that the pig of this invention is modular, in that it is assembled from a plurality of interchangeable parts. More scraper cups and drive cups may be attached as required by a particular job, and other pig components may also be effectively used.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A pipeline pig comprising:
   a. a hollow axially oriented mandrel having a forward flange and an after flange and a radially disposed hole therethrough;
   b. a front drive cup mounted to the forward flange;
   c. a back drive cup mounted to the after flange;
   d. a spacer mounted in abutting contact with the front drive cup;
   e. a scraper cup mounted to the spacer;
   f. a plurality of studs mounted to the scraper cup; and
   g. mounting hardware mounting the plurality of studs to the scraper cup, wherein the mounting hardware is accessible behind the scraper cup.

2. The pig of claim 1, wherein the scraper cup includes a plurality of holes therethrough adapted to receive a plurality of field-replaceable studs.

3. The pig of claim 2, further comprising a plurality of field-replaceable studs in at least some of the plurality of holes.

4. The pig of claim 3, wherein at least some of the studs are toothed studs.

5. The pig of claim 3, wherein at least some of the studs are domed button studs.

6. The pig of claim 3, wherein at least some of the studs are square-shaped studs.

7. The pig of claim 1, wherein the scraper cup is mounted to the pig with a mounting plate.

8. The pig of claim 1, wherein the back drive cup is mounted to the pig with a mounting plate.

9. A pipeline pig comprising:
   a. a hollow axially oriented mandrel having a forward flange and an after flange and a radially disposed hole therethrough;
   b. a front drive cup mounted to the forward flange;
   c. a back drive cup mounted to the after flange;
   d. a spacer mounted in abutting contact with the one of the group consisting of the front drive cup and the back drive cup;

e. a scraper cup mounted to the spacer;
f. a plurality of studs mounted to the scraper cup; and
g. mounting hardware mounting the plurality of studs to the scraper cup, wherein the mounting hardware is accessible behind the scraper cup.

10. The pig of claim 9, wherein a face of the scraper cup is conical.

* * * * *